Aug. 12, 1930.  H. J. DESARZANT  1,772,626
LIQUID LEVEL GAUGE
Original Filed Feb. 20, 1923    2 Sheets-Sheet 1
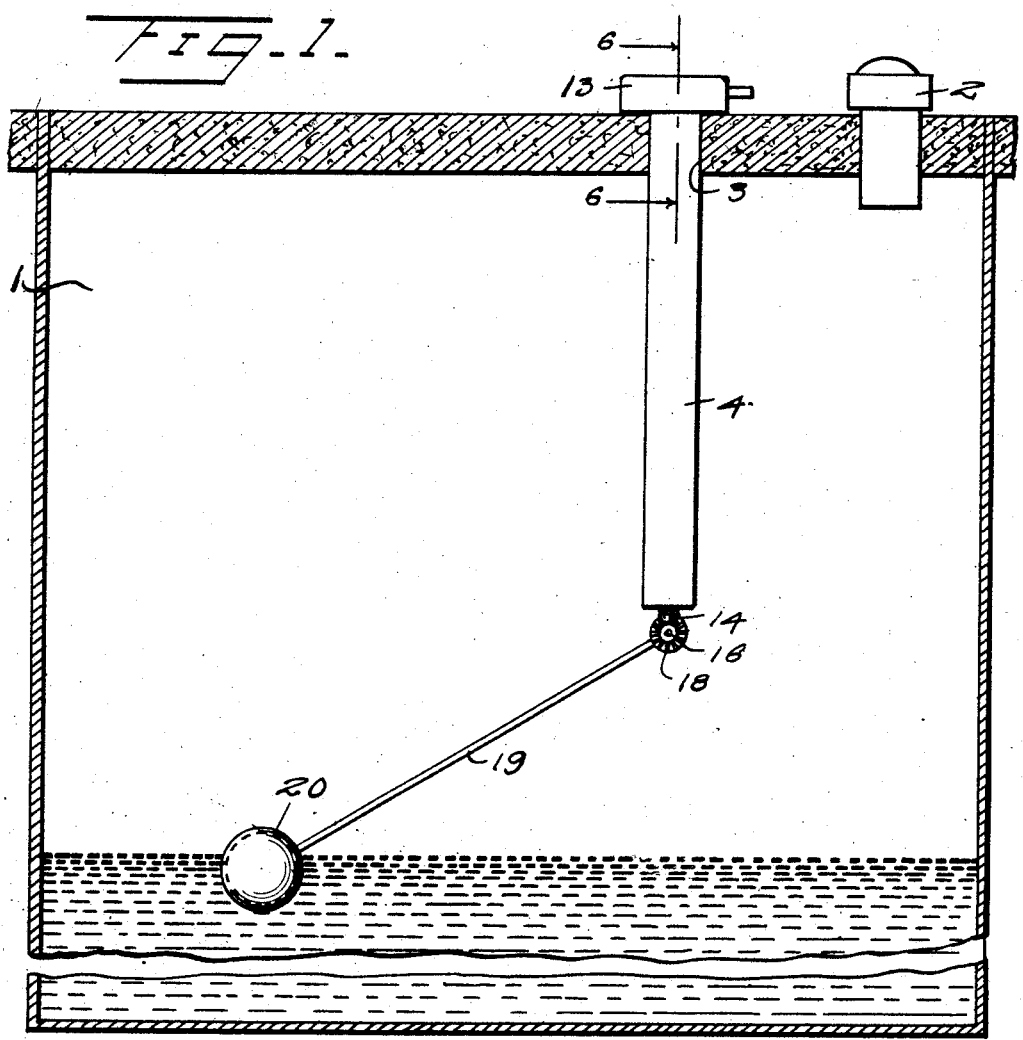
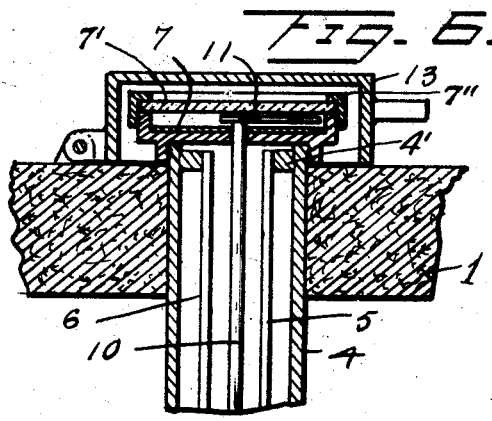
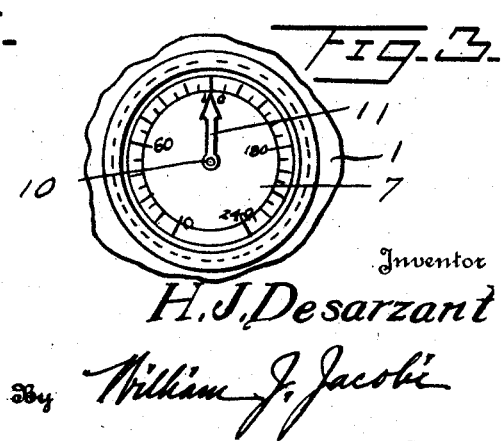
Inventor
H. J. Desarzant
By William J. Jacobi
Attorney Aug. 12, 1930.  H. J. DESARZANT  1,772,626
LIQUID LEVEL GAUGE
Original Filed Feb. 20, 1923  2 Sheets-Sheet 2
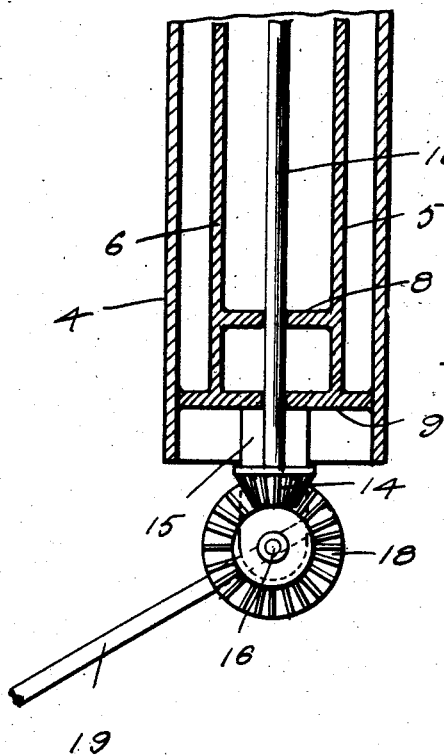
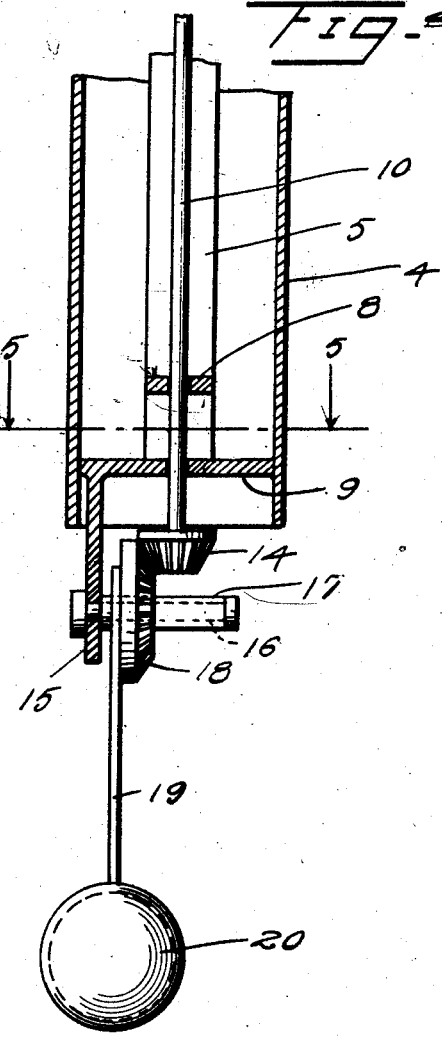
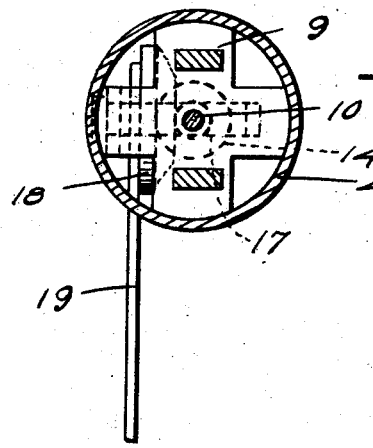
Inventor
H. J. Desarzant.
By William J. Jacobi
Attorney Patented Aug. 12, 1930

1,772,626

UNITED STATES PATENT OFFICE

HENRY J. DESARZANT, OF MEMPHIS, TENNESSEE

LIQUID-LEVEL GAUGE

Application filed February 20, 1923, Serial No. 620,255. Renewed May 28, 1930.

This invention relates to a liquid gauge and has for its principal object to provide a device which can be applied to a tank or any other suitable receptacle wherein a liquid is placed and the gauge applied thereto will enable a person to readily ascertain the amount of liquid within the tank.

In the accompanying drawing forming a part of this specification and in which like numerals designate like parts throughout the same:—

Figure 1 is a sectional elevation showing the gauge applied to a suitable gasoline tank.

Figure 2 is a side elevation of parts shown partly in section and showing the vertically extending shaft and support therefor.

Figure 3 is a top plan view of the dial plate with the hinged cover in an open position.

Figure 4 is a detail view of a portion of the float mechanism.

Figure 5 is a fragmentary plan view of the float supporting member taken on line 5—5 of Figure 4.

Figure 6 is a section on line 6—6 of Figure 1.

As shown in the drawings the device is applied to a tank 1. The said tank is provided with a filling spout 2. The tank is provided at its top side with an opening 3 adapted to receive a pipe 4 which extends down into the tank 1. A spacing frame is positioned in the pipe 4. Said frame consists of longitudinally disposed bars 5 and 6 connected together at their lower portions by a cross bar 8. A bearing plate 9 is carried at the lower end of said frame and extends completely across the interior of the pipe 4 when inserted therein. A shaft 10 is journaled at its upper end in a casing which carries a dial plate 7 and the said casing is closed by a glass 7'. The lower portion of the shaft 10 is journaled in the bar 8 and the plate 9. An indicator finger 11 is carried at the upper end of the shaft 10 and is located above the dial plate 7. A cover 13 is hingedly mounted upon the tank 1 and may be closed over the upper end of the pipe 4 and the parts mounted thereon. The members 5 and 6 hold the dial plate casing and the parts carried by the plate 9 spaced from each other so that there will be no strain upon the indicator finger 11 or upon the parts carried by the shaft 10 and the plate 9 when the device is being inserted in the pipe 4 or being removed therefrom.

A cap 13 is hinged to the top side of the tank 1 and may swing over and enclose the upper end portion of the pipe 4 and the parts mounted thereon as shown in Figure 6. Thus protecting the parts.

The lower end of the vertically extending shaft 10 extends through the bearing plate 9 and carries a suitable bevel gear 14. Depending from the transverse member 9 and approximately in parallel relation with the supporting members 5 and 6 is an arm 15. The lower end of the arm 15 supports a stud 16 which extends transversely to the arm 15 and approximately in parallel relation with the transverse member 9 and the stud 16 supports a sleeve 17. This sleeve 17 carries a bevel gear 18 and this bevel gear 18 is adapted to mesh with the bevel gear 14 carried upon the lower end of the vertically extending shaft 10. The rear face of the bevel gear 18 also supports and carries a lever or arm 19 and at the opposite end of the lever 19 is supported a float 20.

In my device the tank is adapted to be set in the ground such as is customary at filling stations or the like and I do not wish to limit myself to the use of my gauge in only tanks of this character. My gauge can be used on any tank such as on motor vehicles or the like as well as being adapted for use in connection with large tanks which are embedded within the ground.

In the operation of my device it will be seen that when the gasoline is placed within the tank 1 the float 20 will rise with the surface of the gasoline and as the float rises the vertical shaft 10 is caused to rotate and thereby impart rotary motion to the indicator 11 which will cause the indicator finger 11 to move over the graduations on the dial plate 7 and as the gasoline is consumed or taken from the tank 1 the float will descend with the surface of the gasoline and thereby cause the indicating finger 11 to simultaneously move therewith and record the amount of gasoline still remaining within the tank 1. The dial plate 7 is held under a glass 7' by means of a ring 7''. The rods 5 and 6 are connected with the tube 4 by means of members 4'.

Furthermore with a gauge of the above mentioned character the operation is entirely automatic and the simplicity of the same renders it very efficient in its operation and furthermore can be obtained at a minimum cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit of the invention.

What I claim as new and desire to secure by Letters Patent is:—

A liquid level gauge comprising a tubular body, a dial plate casing mounted at one end of the tubular body, a frame structure carried interiorly of the tubular body, a shaft journaled in the frame structure and passing centrally through the dial plate casing, a pointer carried by said shaft, said frame having a lower pendant portion disposed parallel with the longitudinal axis of the tubular body and extending below the lower end of the latter, a pin carried by said extending portion of the frame and located below the tubular body, intermeshing gear wheels carried by the pin and the lower end of the shaft, an arm fixed to the gear wheel which is mounted upon the pin and a float carried by said arm.

In testimony whereof I affix my signature.

his
HENRY J. × DESARZANT.
mark